US012445763B2

(12) United States Patent
Porter et al.

(10) Patent No.: US 12,445,763 B2
(45) Date of Patent: Oct. 14, 2025

(54) SECOND DEGREE OF FREEDOM SPEAKER FOR CAVITY RESONANCE CANCELLATION

(71) Applicant: Meta Platforms Technologies, LLC, Menlo Park, CA (US)

(72) Inventors: Simon Porter, San Jose, CA (US); Guangxin Tang, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 216 days.

(21) Appl. No.: 18/086,881

(22) Filed: Dec. 22, 2022

(65) Prior Publication Data

US 2024/0098404 A1 Mar. 21, 2024

Related U.S. Application Data

(60) Provisional application No. 63/391,561, filed on Jul. 22, 2022.

(51) Int. Cl.
*H04R 1/02* (2006.01)
*H04R 1/28* (2006.01)
*H04R 7/06* (2006.01)

(52) U.S. Cl.
CPC ............. *H04R 1/2811* (2013.01); *H04R 1/02* (2013.01)

(58) Field of Classification Search
CPC ........... H04R 1/2811; H04R 1/02; H04R 7/06
See application file for complete search history.

(56) References Cited

U.S. PATENT DOCUMENTS 10,484,788 B1 * 11/2019 Kudekar .............. H04R 1/2834
2009/0169049 A1 * 7/2009 Sun .......................... H04R 7/06
381/423
2017/0195796 A1 * 7/2017 Salvatti .................... H04R 9/18
2018/0098155 A1 * 4/2018 Tanaka ..................... H04R 9/08
2022/0201385 A1 * 6/2022 Corynen .................. H04R 7/18

* cited by examiner

*Primary Examiner* — Suhan Ni
(74) *Attorney, Agent, or Firm* — Greenberg Traurig, LLP

(57) ABSTRACT

A speaker produces acoustic frequencies within a housing that outputs the acoustic frequencies to a port. The produced frequencies travel through a cavity to the port which may have a cavity resonance that amplifies certain frequencies, affecting the frequency sensitivity of the speaker. To mitigate the cavity resonance, the speaker includes a membrane with regions having different breakup frequencies. One region is tuned to break up at a desired bandwidth of the speaker, and another region is tuned to break up at the cavity resonance, mitigating the distortion on frequency response due to the cavity resonance.

20 Claims, 6 Drawing Sheets

SECOND DEGREE OF FREEDOM SPEAKER FOR CAVITY RESONANCE CANCELLATION

CROSS-REFERENCE TO RELATED APPLICATIONS

This application claims the benefit of U.S. Provisional Application No. 63/391,561, filed Jul. 22, 2022, which is incorporated by reference.

FIELD OF THE INVENTION

This disclosure relates generally to speakers, and more specifically to a second degree of freedom speaker for cavity resonance cancellation.

BACKGROUND

Speakers with vents (e.g., ports) may include physical cavities that have an acoustic resonance that increases acoustic sensitivity at its resonance frequencies. This increase in acoustic sensitivity may amplify signals received at those frequencies as well as any non-linear harmonic distortion products of the speaker driving the cavity. This reduces audio quality (e.g., from the added distortion) and thus degrades signal fidelity for a listener of the acoustic output of the port. To address the acoustic resonance of the cavity, this may typically be addressed by implementing a Helmholtz Resonator (HHR) tuned to the cavity resonance to absorb the cavity resonance, thus reducing distortion and increasing audio quality. However, implementing an HHR has several drawbacks. HHRs require space within a speaker housing to integrate, which at a given speaker housing size reduces the portion of space within the speaker housing available for diaphragm surface area. Particularly for smaller speakers, such as in wearable devices (such as headsets, earpieces, or earbuds), reduced diaphragm surface area limits bass performance and reduces power efficiency. In addition, HHRs add design, tooling, assembly complexity, and corresponding cost to the speaker.

SUMMARY

Described herein is speaker having a second degree of freedom that can be used for cavity resonance cancellation. The speaker may be integrated into a device such that sound is ported from the speaker to a local area. Accordingly, the speaker has a cavity in front of it that has an associated resonance. As described herein, the speaker is configured to operate in a manner that mitigates the associated resonance. The speaker includes a transducer that vibrates a membrane (e.g., a diaphragm) to generate acoustic waves. To account for the resonance of the cavity, the membrane may include regions having different acoustic properties. A first region may be configured to operate across a wide range of frequencies (including higher frequencies than the cavity resonance), while a second region of the membrane is configured to mitigate the cavity resonance. At frequencies below the cavity resonance, the second region may operate normally, such that the output of the speaker at frequencies below the cavity resonance may be boosted. For small speakers, this may be particularly useful in improving bass and/or mid-range output as the second region may simultaneously boost performance below the cavity resonance and mitigate distortion attributable to the cavity resonance.

In one implementation, the second region is designed with a breakup frequency based on the cavity resonance, such that the breakup of the second region may mitigate the cavity resonance. The first region may have a higher breakup frequency such that it may provide a desired frequency range for the speaker as a whole (e.g., a breakup frequency higher than human hearing). To provide the different breakup frequencies, the regions may be tuned with different mass, stiffness, or damping. As such, the geometries, materials (and composition thereof) and other qualities may be different between the regions to effect the different breakup frequencies. As such, the breakup frequency of the second region may provide a second "degree of freedom" to the speaker that mitigates the cavity resonance.

Figure 1A:
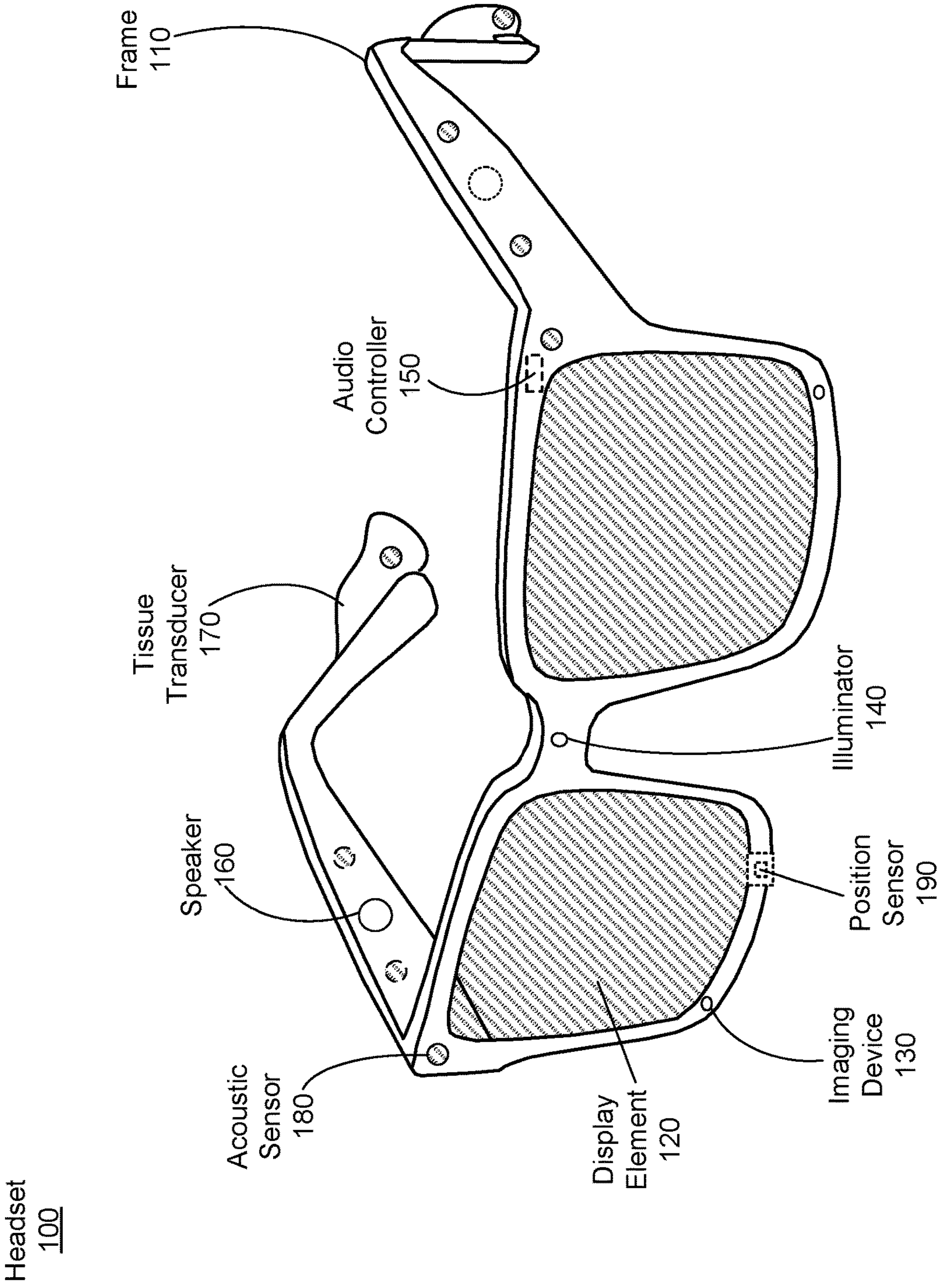
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Typical speakers are designed to operate in rigid body mode throughout its desired frequency bandwidth. Speakers include a transducer that vibrates a membrane (e.g., a diaphragm) that generates acoustic waves. The "rigid body mode" refers to movement of the membrane together as a relatively rigid body, such that the portions of the membrane move together. At frequencies above rigid body mode, the membrane starts to "break-up," where parts of the membrane move out of phase with one another, causing a reduction in sensitivity at these frequencies. The first/lowest frequency break up mode, which may be referred to as the "dumbo" or "flapping" mode, occurs where the edges of the speaker are moving out of phase (in the opposite direction) to the center of the speaker, thus reducing the sensitivity of the speaker at that frequency.

The speaker described herein utilizes this "flapping" mode to reduce the sensitivity of the speaker itself, targeted at a resonance of a cavity (e.g., a front cavity in a bipole speaker). In practice, this means any audio content that is created by the speaker's operation either at the flapping modes' resonant frequency or at a sub-harmonic of the flapping mode frequency will have lower acoustic sensitivity relative to the rigid body operation frequency range. By pairing this reduced speaker sensitivity with the acoustic cavity's increased sensitivity, the speaker mitigates distortions caused by the cavity and improves user experience. As such, embodiments may use a membrane (e.g., a diaphragm) that includes a region that may operate higher than the cavity resonance (i.e., the region has a higher breakup frequency than the cavity resonance) and another region having a lower breakup frequency that mitigates the distortions of the cavity resonance.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user, such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated in FIG. 1A, the headset includes a display element 120 for each eye of a user. In some embodiments, a display element 120 generates image light that is provided to an eyebox of the headset 100. The eyebox is a location in space that an eye of a user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or out-coupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to a user. The transducer array includes a plurality of transducers. A transducer may be a part of a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The speakers 160 may include one or more speakers in which the speaker includes a cavity that may have a resonant frequency. These speakers may include a membrane that includes a region that mitigates the distortion caused by the resonant frequency. Another region of the membrane may be tuned to produce acoustic waves at frequencies above the resonant frequency, such that the two regions together may provide better fidelity to the audio signal and mitigate effects of the resonant frequency. These are further discussed below.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
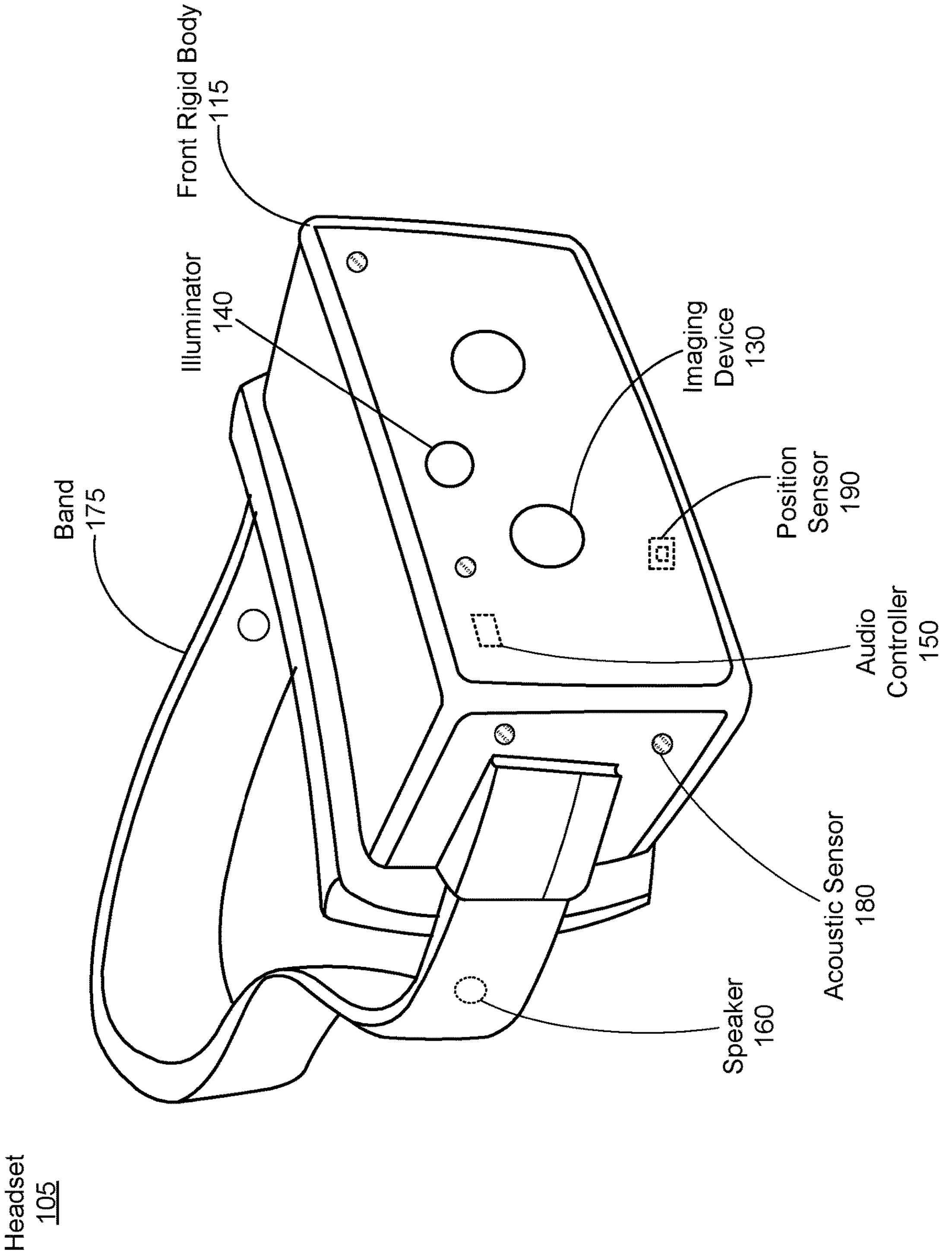
FIG. 1B is a perspective view of a headset implemented as a head-mounted display, in accordance with one or more embodiments.

FIG. 1B is a perspective view of a headset 105 implemented as a head-mounted display (HMD), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
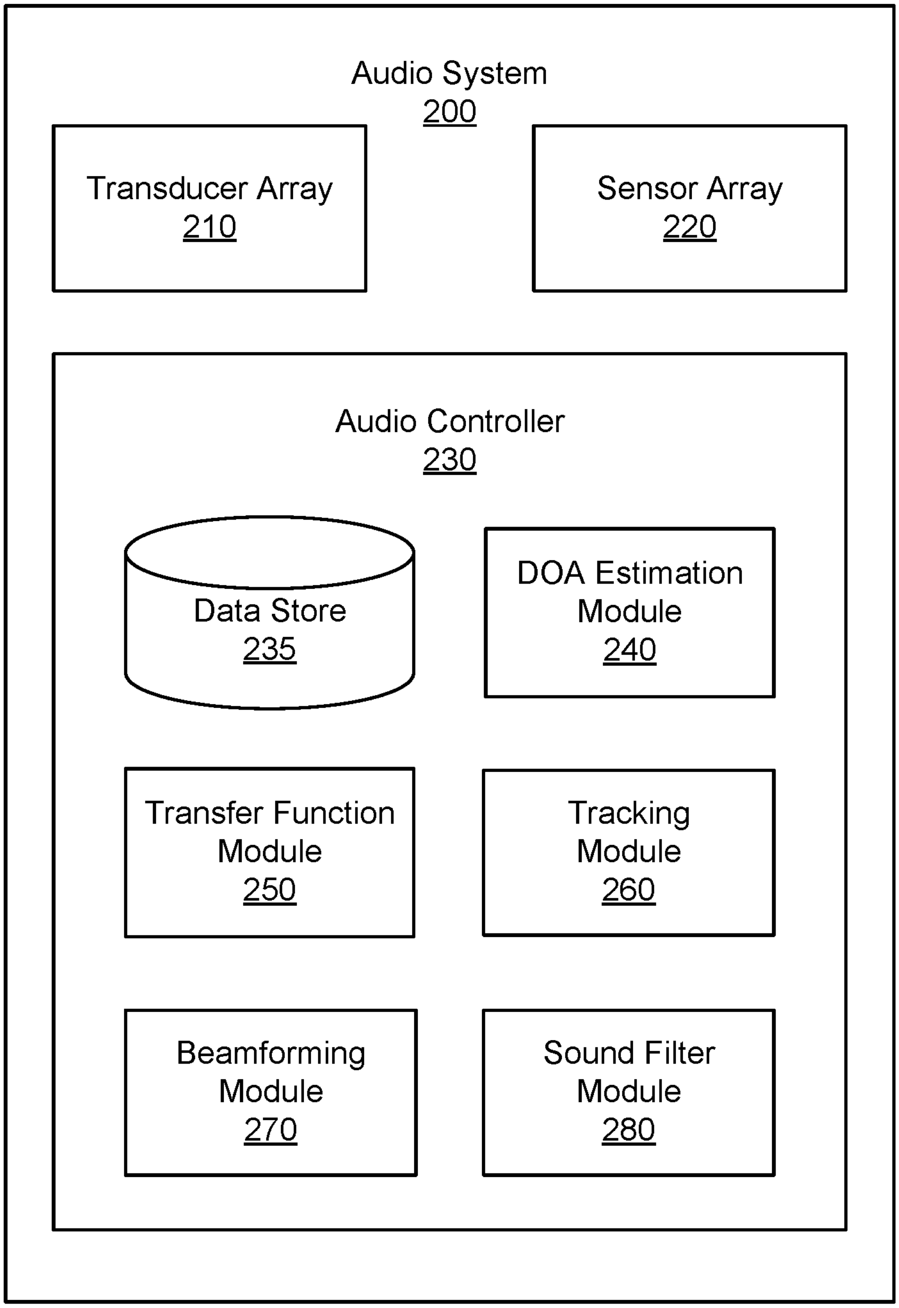
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle of a user coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum of the user.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, a virtual model of a local area, direction of arrival estimates, sound filters, and other data relevant for use by the audio system 200, or any combination thereof.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while deemphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 5).

The sound filter module 280 provides the sound filters to the transducer array 210. In some embodiments, the sound filters may cause positive or negative amplification of sounds as a function of frequency.

Figure 3:
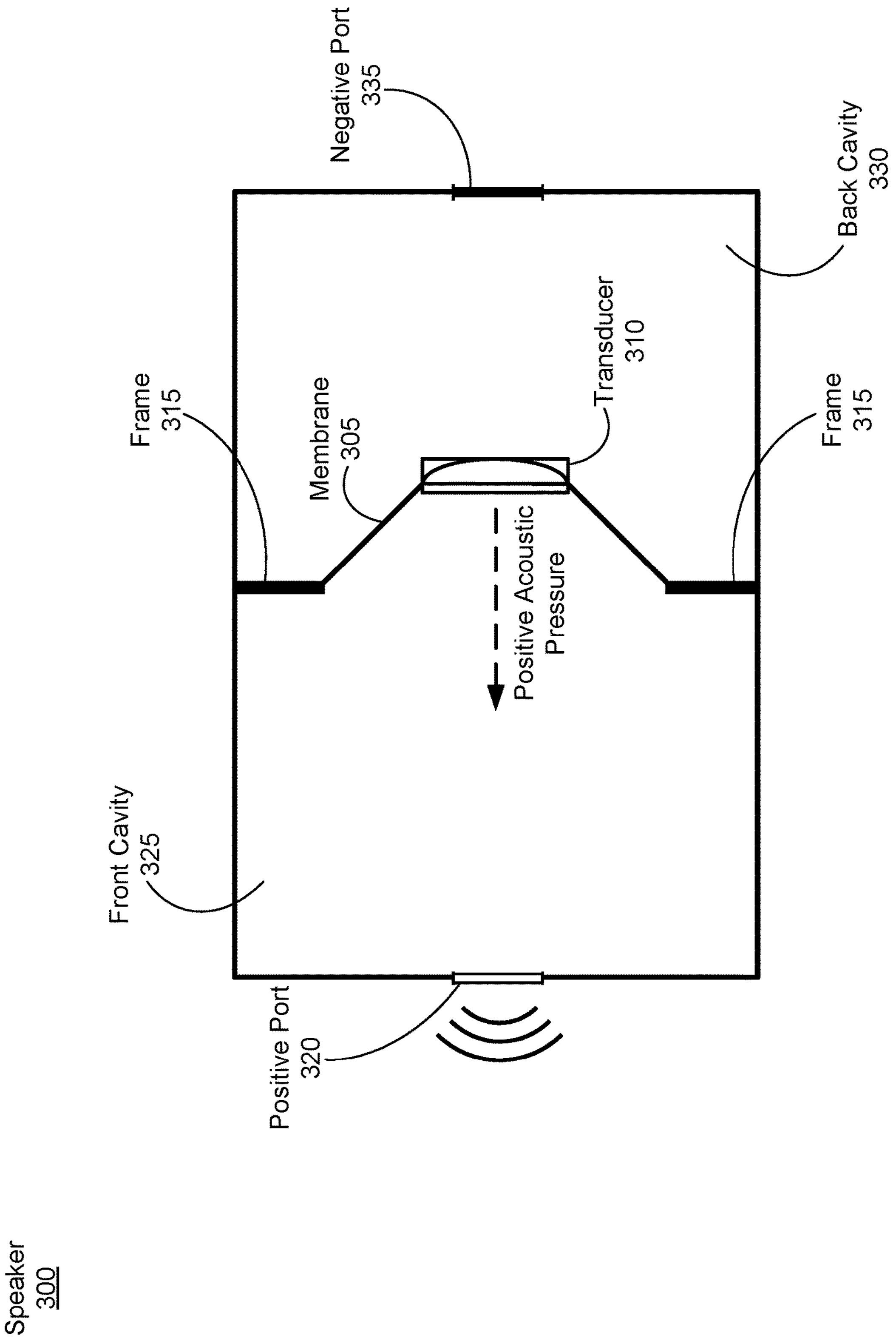
FIG. 3 is a cross-sectional view of a speaker, according to one embodiment.

FIG. 3 is a cross-sectional view of a speaker 300, according to one embodiment. The speaker 300 may be included in various types of devices, including headset 100 and headset 105 (e.g., as a speaker 160) as one of the audio transducers. The example in FIG. 3 is a simplified abstraction of a ported speaker 300 in which acoustic pressure waves are generated within a speaker housing, and the acoustic pressure waves travel to a port as output of the speaker 300. Embodiments of the speaker 300 may have varying sizes, shapes, and configurations for the various components, such as the speaker housing, ports, a membrane 305, and so forth. In general, embodiments of the speaker 300 may be used with relatively small speakers, such as those that may be used on wearable devices (e.g., headphones, earbuds, integrated within glasses or headsets, and so forth). Additional embodiments may be used with different configurations and/or types of devices used in conjunction with one or more speakers 300.

The speaker 300 generates acoustic pressure waves that may be output to one or more ports of the speaker, including in this example a positive port 320 and a negative port 335. When the speaker 300 is implemented in a wearable device, the positive port 320 is typically directed towards a listener's ear, such that acoustic pressure waves from vibration of a membrane 305 exit the positive port 320 and are perceived as sound by the user. A transducer 310 as depicted here is a voice coil speaker as a simplified abstraction in conjunction with the membrane 305 (e.g., a diaphragm) supported by a frame 315. In this example, the membrane 305 is conical, although other shapes and configurations may also be used. In practice, additional and other components, including a voice coil portion that drives the membrane, may be included. In this example, the speaker 300 is a dipole audio assembly that may generate both positive acoustic pressure waves and negative acoustic pressure waves to create audio content. When the membrane 305 displaces forward, a high-pressure zone is created in a front area of the membrane 305, thus generating a positive acoustic pressure wave from the front surface of the membrane 305, and a low-pressure zone is created in an area behind the membrane 305 generating a negative acoustic pressure wave from the back surface of the membrane 305.

The transducer 310 drives displacement of the membrane 305 based on received signals to generate positive acoustic pressure waves and negative acoustic pressure waves. When oscillating, the front surface of the membrane 305 corresponding to the front surface of the transducer 310 generates the positive acoustic pressure wave, while the back surface of the membrane 305 corresponding to the back surface of the transducer 310 generates the negative acoustic pressure wave. There are various mechanisms that may be implemented as the transducer 310 driving the displacement of the membrane 305. In one or more implementations, the transducer 310 is a voice coil transducer including an electromagnet electrically controlled to drive the diaphragm. Additional implementations use electrostatic transducers with a flexible conductive membrane controllable by electrically conductive grids sandwiched on either side of the membrane which drive displacement of the membrane with electrostatic forces. Other implementations or variations of the above implementations may include but are not limited to piezoelectric transducers, armature transducers, other mechanical transducers, or any combination thereof.

In the example of FIG. 3, the speaker 300 is a bipole speaker, such that the positive and negative pressure waves may be output to a respective positive port 320 and a negative port 335 of a speaker housing. In some embodiments, the speaker housing may include no negative port 335, such that the speaker operates as a monopole speaker with respect to positive port 320. In further embodiments, the positive port 320 and negative port 335 may face other directions or may include additional geometrics, such as a waveguide, to direct the acoustic pressure waves, to amplify or dampen certain frequencies, or to vent the acoustic pressure in different directions. As one example, the ports of the speaker may implement a wearable open-ear dipole speaker.

The area in front of the membrane 305 forms a front cavity 325, and the area behind the membrane 305 forms a back cavity 330 through which the respective acoustic pressure waves travel to the respective ports. Though shown here in abstraction, the particular shape of the front cavity 325 (as well as back cavity 330) may operate as a waveguide for the acoustic pressure waves. The dimensions of the cavity influence the propagation of the acoustic pressure waves. The configuration of the cavities may vary in size, shape, material, and so forth. For example, a size and/or a shape of the front cavity 325 and back cavity 330 may be optimized to be more conducive for propagation for a particular range of frequencies. In addition, the positive port 320 and negative port 335 may differ in shape, number, material, and so forth in various embodiments and may be covered by a mesh or other filter that may affect acoustic transmission through the port and may prevent introduction of dust or other contaminants into the cavities.

The particular size and shape of the front cavity 325 and back cavity 330, generally referred to as being a respective "cavity volume," may also affect acoustic frequencies. The front cavity 325 may have an acoustic resonance that amplifies acoustic pressure waves at resonance frequencies and may similarly amplify non-linear harmonic distortion. The acoustic resonance for a cavity may also be referred to as a "cavity resonance." As such, the positive acoustic pressure generated by the membrane 305 may be affected by the acoustic resonance of the front cavity 325. The acoustic resonance is a function of the cavity volume and other characteristics of the front cavity 325 (e.g., materials, shape, etc.). Although the particular acoustic resonance varies in different configurations as just discussed, as examples, the acoustic resonance in some embodiments affects midtone frequencies in the range of 1-10 kHz. The resonance frequency of a particular configuration may be determined based on a modeling or simulation of the acoustic properties of the speaker or may be empirically determined by evaluating output characteristics of the acoustic pressure waves output from the positive port 320. Similarly, the negative acoustic waves may be affected by a volume of the back cavity 330 and an associated acoustic resonance. In some embodiments, the characteristics of the front cavity 325 and back cavity 330 are designed to have similar (or the same) acoustic resonance (e.g., with a front cavity volume similar to the back cavity volume).

The membrane 305 may also be designed to generally increase or maximize a surface area of the membrane 305 within the speaker housing, which may increase the volume of air that may be moved by the membrane 305. In general, a larger diameter of the membrane 305 optimizes power efficiency in generating the acoustic pressure waves, as a larger membrane is able to displace more air when displaced the same distance relative to a smaller membrane. As discussed further below, such as with respect to FIG. 4, the membrane includes a region that mitigates the harmonic resonance of the front cavity 325, such that distortion attributable to the cavity resonance is reduced. As the harmonic resonance is reduced with a portion of the membrane 305, the membrane itself may occupy a larger portion of the speaker housing and thus have a larger surface area for air displacement relative to approaches that use different solutions for mitigating the harmonic resonance (e.g., when a Helmholtz Resonator is used to mitigate the cavity resonance).

Figure 4:
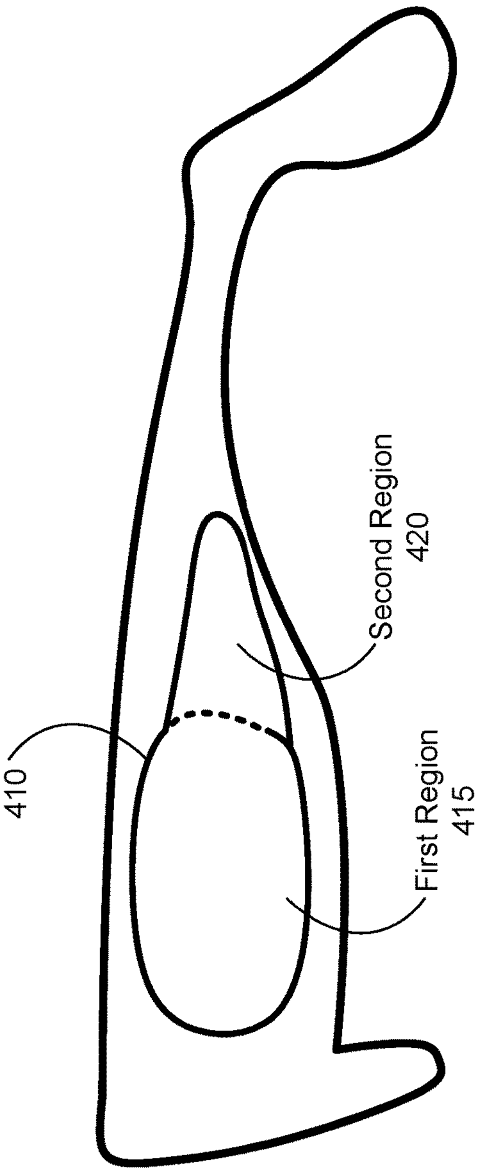
FIG. 4 shows an example side view of a headset including a speaker, according to one embodiment.

FIG. 4 shows an example side view of a headset 400 including a speaker, according to one embodiment. The view of FIG. 4 shows an example position of the membrane for a speaker within the headset 400. The speaker may include the components as shown in FIG. 3 and a port (not shown) for positive acoustic pressure waves to be directed towards a wearer's ears. The speaker in FIG. 4 has a single membrane 410 that includes a first region 415 and a second region 420. These regions of the membrane 410 may operate to simultaneously output acoustic pressure waves across an acoustic bandwidth range (e.g., for an input signal) while mitigating distortion that may otherwise be caused by an acoustic resonance from a cavity of a speaker.

In this embodiment, the first region 415 of the membrane 410 may be tuned to provide acoustic sensitivity across the desired acoustic bandwidth of the speaker. That is, the first region 415 may reproduce the frequencies across the desired bandwidth and outside of those frequencies (e.g., at higher frequencies than a breakup frequency), the first region may degrade in performance (e.g., due to the breakup). The membrane 410 is generally constructed of relatively stiff, thin materials. Lower mass of the membrane 410 reduces energy required for the transducer to displace the membrane 410, while increasing stiffness of the membrane 410 may increase the bandwidth range at which the membrane operates without degradation. The first region 415 of the membrane 410 may generally be tuned to operate in a rigid body mode, as discussed above, across the desired acoustic bandwidth of the speaker, such that the first region 415 effectively provides acoustic pressure waves throughout the output acoustic bandwidth. As discussed above, the acoustic resonance of the cavity of a speaker may amplify respective frequencies, such that when the acoustic bandwidth of the speaker includes the acoustic resonance, the acoustic pressure waves of the first region may be distorted by the amplification of the acoustic resonance.

To counteract the acoustic resonance from the cavity (the "cavity resonance"), the second region 420 of the membrane has a different frequency response profile (e.g., which may be characterized as a graph) that reduces the frequency sensitivity of the second region 420 at the cavity resonance and thus mitigate the acoustic resonance. In one embodiment, the second region 420 is tuned to a breakup frequency corresponding to the cavity resonance. As such, the second region may "break up" at the cavity resonance and reduce the frequency sensitivity. In one embodiment, at the breakup frequency of the second region, portions of the second region may oscillate out of phase with the transducer to reduce its frequency response at the cavity resonance and thus mitigating the amplification due to the cavity resonance. Stated another way, in some embodiments the membrane includes one portion (i.e., the first region 415) that has a first breakup frequency (that may correspond to the desired frequency bandwidth of the speaker), and the membrane includes another portion (i.e., the second region 420) that has a second breakup frequency that mitigates the cavity resonance.

In some embodiments, the first region 415 and second region 420 are unitary, such that the transducer operates on the membrane 410 as a whole. At relatively lower frequencies, both regions may operate in rigid body mode, such that both regions may effectively contribute to acoustic waves at these frequencies. For frequencies at the cavity resonance (corresponding to the breakup frequency of the second region 420), the first region 415 may continue to operate in rigid body mode, while the second region may experience breakup, such that it mitigates the cavity resonance. The first region may continue to operate in rigid body mode until its breakup frequency. In some embodiments, the first region may be tuned to have a breakup frequency higher than the frequencies audible for humans, e.g., 15-20 kHz.

The portion of the membrane 410 allocated to the first region 415 and the second region 420 may differ in different embodiments. In some embodiments, the first region 415 is larger than the second region 420. In further embodiments, the second region 420 is in the range of 10-40% of the size of the membrane 410. The relative sizes of the first region 415 and second region 420 may be tuned to balance the extent to which cavity resonance may increase frequencies of the first region 415, relative to the extent to which the second region 420 may mitigate the cavity resonance. In general, the size of the first region 415 may be designed to be maximized to increase the frequency sensitivity of the speaker throughout its acoustic bandwidth (e.g., at the higher breakup frequency of the first region), with the size of the second region 420 is determined to mitigate the effect of the cavity resonance.

To modify the breakup frequency of the second region 420 with respect to the breakup frequency of the first region 415, the second region 420 may have a modified composition of materials or other properties that affect its breakup frequency. As one embodiment, the second region 420 may have a different Young's Modulus than the first region 415, such that the second region 420 is less stiff than the first region 415 and thus may break up at a lower frequency. The second region 420 may thus use a different combination of materials, at a different thickness, or with a different damping material composition. In some embodiments, the membrane may be composed of multiple layers, such that an inner layer provides increased stiffness (and may be made of a stiffer material) surrounded by outer layers. In one embodiment, the stiffness of the second region 420 may be modified by reducing the thickness of or omitting a layer of the membrane 410 or by forming the second region 420 with a different material composition than the first region 415. For example, the second region 420 may lack a middle layer of a material that is included in the first region 415.

As such, in addition to mitigating the frequency sensitivity, the second region 420 may contribute to acoustic production below its breakup frequency, boosting lower-frequency (e.g., bass) acoustic production by the speaker.

The first and second regions operate as described above to mitigate resonance associated with the cavity in front of the membrane. In some embodiments, the second region 420 occupies a portion of the speaker housing that may otherwise be allocated to another type of component that mitigates the cavity resonance, such as a Helmholtz Resonator. As such, mitigating the cavity resonance with a portion of the membrane enables the membrane to use a higher portion of the space within the speaker housing, which may enable the membrane to increase in size for the same speaker housing, increasing the volume of air that may be displaced by the membrane and increasing power efficiency of the speaker. Likewise, this configuration may also increase bass performance as discussed above.

Accordingly, the speaker described herein may mitigate the cavity resonance without a Helmholtz Resonator. In some embodiments, replacing the space that may otherwise be allocated to the Helmholtz Resonator with an additional speaker membrane may increase the surface area of the membrane in the range of 10-30%. This may cause volume displacement by ~1-3 dB and result in increased bass extension by ~15-40% of an octave. This also increases sensitivity by ~1-3 dB and may reduce power requirement to the range of 50-80% of a comparable speaker design that uses a Helmholtz Resonator. In addition, design, tooling, and assembly complexity along with material and assembly costs may be reduced while increasing yield (e.g., due to fewer assembly steps).

As such, embodiments may include the design and construction of the speaker discussed above. For example, embodiments may include constructing a speaker having a membrane having regions with different breakup frequencies, in which one breakup frequency mitigates the cavity resonance. To do so, the cavity resonance may be determined based on the cavity volume and/or other characteristics, for example via simulation or other modeling, and a breakup frequency for the second portion may be determined based on the cavity resonance. The mass, thickness, damping, and other characteristics of the second portion may then be determined to tune the breakup frequency of the second region to mitigate the cavity resonance. The membrane with the tuned second region may then be manufactured according to the designed characteristics and assembled in a speaker housing having a cavity with the cavity resonance.

Figure 5:
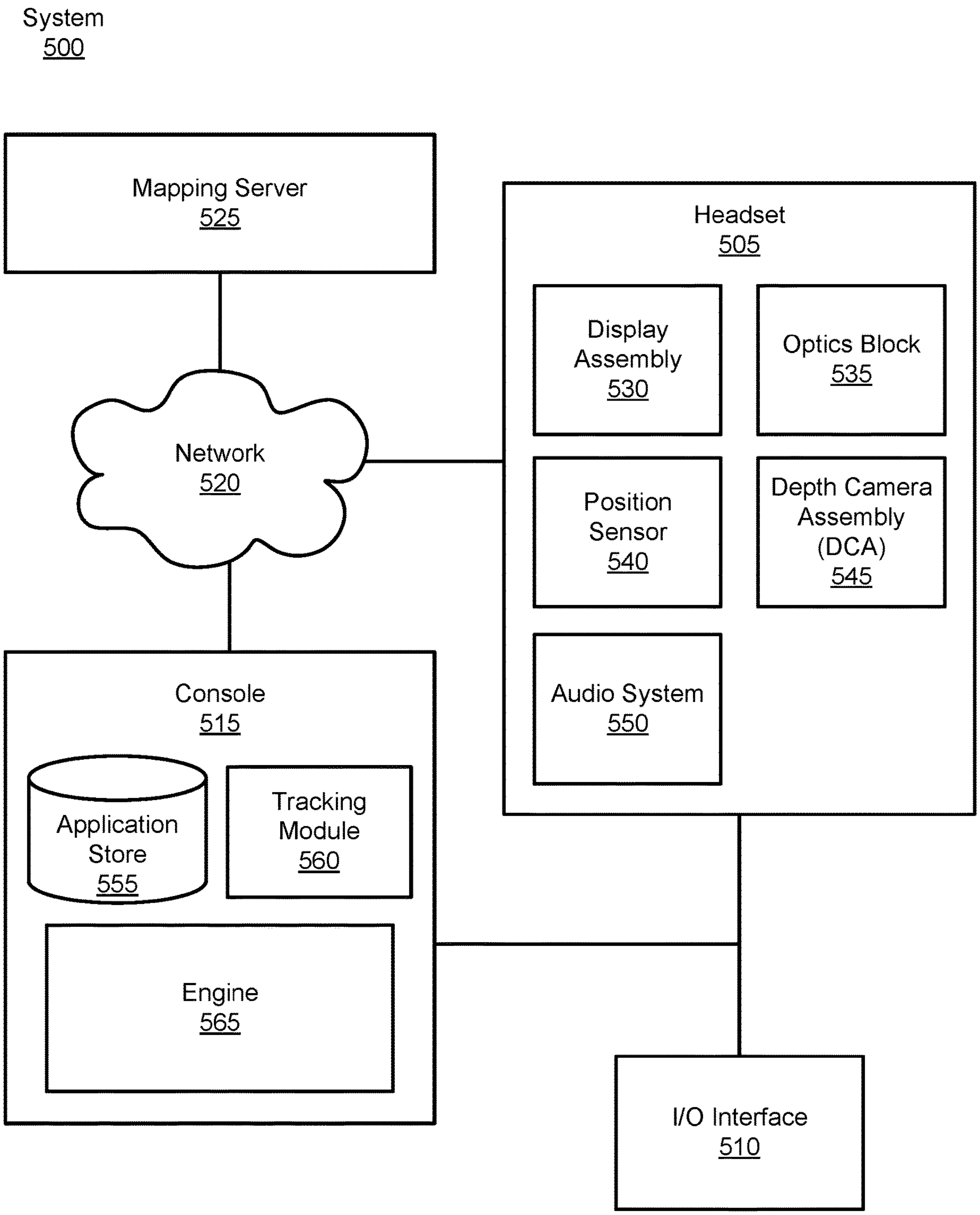
FIG. 5 is a system that includes a headset, according to one embodiment.

FIG. 5 is a system 500 that includes a headset 505, according to one embodiment. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, a network 520, and a mapping server 525. While FIG. 5 shows an example system 500 including one headset 505 and one I/O interface 510, in other embodiments, any number of these components may be included in the system 500. For example, there may be multiple headsets, wherein each headset includes an associated I/O interface 510 with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes a display assembly 530, an optics block 535, one or more position sensors 540, and a DCA 545. Some embodiments of headset 505 have different components than those described in conjunction with FIG. 5. Additionally, the functionality provided by various components described in conjunction with FIG. 5 may be differently distributed among the components of the headset 505 in other embodiments or may be captured in separate assemblies remote from the headset 505.

The display assembly 530 displays content to the user in accordance with data received from the console 515. The display assembly 530 displays the content using one or more display elements (e.g., the display elements 120, as shown in FIG. 1). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note that in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view (FoV) of the content presented by the electronic display. For example, the FoV of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to the motion of the headset 505. The position sensor 190 as shown in FIG. 1 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, in practice, the reference point is defined as a point within the headset 505.

The DCA 545 generates depth information for a portion of a local area of the headset 505. The DCA includes one or more imaging devices and a DCA controller. The DCA 545 may also include an illuminator. Operation and structure of the DCA 545 is described above with regards to FIG. 1A.

The audio system 550 provides audio content to a user of the headset 505. The audio system 550 is substantially the same as the audio system 200 as described above in FIG. 2. The audio system 550 may comprise one or more acoustic sensors, one or more transducers, and an audio controller.

The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information describing at least a portion of the local area from, for example, the DCA 545 and/or location information for the headset 505 from the position sensor 540. The audio system 550 may generate one or more sound filters using one or more of the acoustic parameters received from the mapping server 525 and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices, such as a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505 or a remote system.

The application store 555 stores one or more applications for execution by the console 515. An application is a group of instructions that, when executed by a processor, generates content for presentation to the user. Content generated by an application may be in response to inputs received from the user via movement of the headset 505 or the I/O interface 510. Examples of applications include gaming applications, conferencing applications, video playback applications, or other suitable applications.

The tracking module 560 tracks the movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G/5G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g., Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user of the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A speaker comprising:

a membrane including a first region and a second region that when vibrated provides audio content through a cavity to a port that outputs the audio content to a local area of the speaker, the first region having a first breakup frequency higher than a resonance frequency of the cavity, and the second region having a second breakup frequency that is lower than the first breakup frequency and the resonance frequency of the cavity, such that for frequencies above the second breakup frequency the second region of the membrane generates audio content that mitigates a resonance of the cavity; and a transducer configured to vibrate the membrane.

2. The speaker of claim 1, wherein the first region is larger than the second region.

3. The speaker of claim 1, wherein the second breakup frequency is tuned based on a volume of the cavity.

4. The speaker of claim 1, wherein the second region has a different stiffness than the first region.

5. The speaker of claim 1, wherein the first region is composed of a plurality of layered materials and the second region lacks at least a portion of a layer of the plurality of layered materials.

6. The speaker of claim 1, wherein the second region is thinner than the first region.

7. The speaker of claim 1, wherein the second region has a lower stiffness than the first region.

8. The speaker of claim 1, wherein the speaker is a bipole speaker, wherein the membrane, when vibrated, produces positive acoustic pressure towards the port and negative acoustic pressure through another cavity towards another port.

9. The speaker of claim 8, wherein the resonance frequency of the cavity is substantially similar to another resonance frequency of the other cavity.

10. A wearable device including the speaker of claim 1 configured such that when worn by a wearer, the port faces towards an ear of the wearer.

11. The speaker of claim 1, wherein the first region and the second region operate in a rigid body mode below the resonance frequency.

12. The speaker of claim 1, wherein the speaker does not include a Helmholtz Resonator tuned to mitigate the resonance frequency.

13. The speaker of claim 1, wherein the first breakup frequency is above a frequency range of human hearing.

14. The speaker of claim 1, wherein the first breakup frequency is above 15 kHz.

15. The speaker of claim 1, wherein the second breakup frequency is within a frequency range of human hearing.

16. The speaker of claim 1, wherein the first and second regions of the membrane are unitary.

17. A method comprising:

identifying an acoustic resonance of a cavity of a speaker having a membrane and a transducer, the membrane having a first region with a first breakup frequency above the acoustic resonance; and tuning a second region of the membrane to have a second breakup frequency below the first breakup frequency to mitigate the acoustic resonance of the cavity of the speaker.

18. The method of claim 17, wherein tuning the second region comprises modifying a stiffness of the second region relative to the first region.

19. The method of claim 17, wherein the acoustic resonance is identified based on a volume of the cavity between the membrane and a port that outputs audio content to a local area of the speaker.

20. The method of claim 17, wherein the speaker does not include a Helmholtz Resonator tuned to mitigate the acoustic resonance.

* * * * *